US009294269B2

United States Patent
Tanaka et al.

(10) Patent No.: US 9,294,269 B2
(45) Date of Patent: Mar. 22, 2016

(54) COMMUNICATION APPARATUS AND COMMUNICATION METHOD

(71) Applicant: KABUSHIKI KAISHA TOSHIBA, Minato-ku, Tokyo (JP)

(72) Inventors: Yasuyuki Tanaka, Chigasaki (JP); Mitsuru Kanada, Tokyo (JP); Yoshimichi Tanizawa, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 78 days.

(21) Appl. No.: 14/085,161

(22) Filed: Nov. 20, 2013

(65) Prior Publication Data

US 2014/0143537 A1 May 22, 2014

(30) Foreign Application Priority Data

Nov. 21, 2012 (JP) ................. 2012-255300

(51) Int. Cl.
*H04L 29/06* (2006.01)
*H04L 9/08* (2006.01)
*H04L 9/32* (2006.01)

(52) U.S. Cl.
CPC .............. *H04L 9/083* (2013.01); *H04L 9/0861* (2013.01); *H04L 9/321* (2013.01); *H04L 63/061* (2013.01)

(58) Field of Classification Search
CPC ....... H04L 9/083; H04L 9/0861; H04L 9/321; H04L 63/061
USPC ............................ 713/155, 168, 171; 726/2
See application file for complete search history.

(56) References Cited

U.S. PATENT DOCUMENTS

| | | | |
|---|---|---|---|
| 7,266,202 B1 * | 9/2007 | Kawakami ........ G06F 17/30044 | 380/201 |
| 8,898,454 B2 * | 11/2014 | Tanaka et al. ................. | 713/155 |
| 2004/0049687 A1 * | 3/2004 | Orsini et al. .................. | 713/189 |
| 2011/0246766 A1 * | 10/2011 | Orsini et al. .................. | 713/160 |
| 2012/0226904 A1 * | 9/2012 | Orsini et al. .................. | 713/167 |
| 2013/0067214 A1 * | 3/2013 | Tanaka et al. ................. | 713/150 |
| 2013/0227173 A1 | 8/2013 | Tanaka et al. | |

FOREIGN PATENT DOCUMENTS

JP 2011-239146 A 11/2011

* cited by examiner

*Primary Examiner* — Samson Lemma

(74) *Attorney, Agent, or Firm* — Ohlandt, Greeley, Ruggiero & Perle, L.L.P.

(57) ABSTRACT

In general, according to one embodiment, a communication apparatus includes an obtaining unit, generation unit, and communication unit. The obtaining unit obtains a master key from a first communication apparatus. The generation unit generates an individual key using the master key. The communication unit communicates with a second communication apparatus using the individual key.

6 Claims, 5 Drawing Sheets

COMMUNICATION APPARATUS AND COMMUNICATION METHOD

CROSS-REFERENCE TO RELATED APPLICATIONS

This application is based upon and claims the benefit of priority from Japanese Patent Application No. 2012-255300, filed Nov. 21, 2012, the entire contents of which are incorporated herein by reference.

FIELD

Embodiments described herein relate to a communication apparatus, a communication method and a system.

BACKGROUND

Upon network access authentication, a server can notify a client of a key. In an actual operation, however, it is difficult for a server to send an encryption key used between nodes which communicate with each other. This is because the combination of nodes which communicate with each other within a wireless mesh network is unknown at the time of network access authentication.

DETAILED DESCRIPTION

In general, according to one embodiment, a communication apparatus includes an obtaining unit, generation unit, and communication unit. The obtaining unit obtains a master key from a first communication apparatus. The generation unit generates an individual key using the master key. The communication unit communicates with a second communication apparatus using the individual key.

Embodiments will be described below with reference to the accompanying drawings.

First Embodiment

Figure 1:
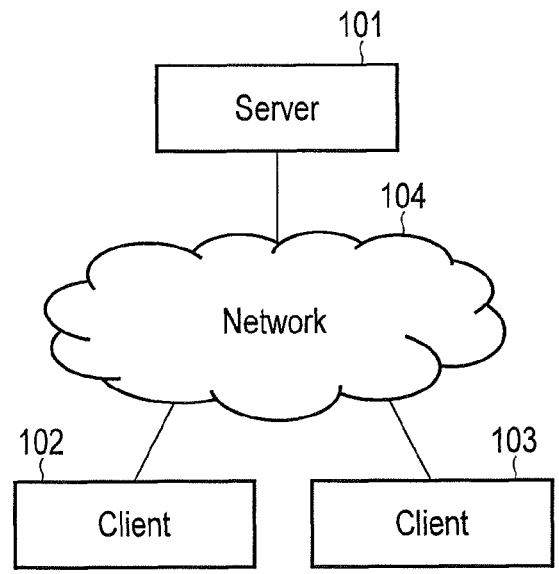
FIG. 1 is a view showing a network configuration according to the first embodiment.

FIG. 1 is a view showing a network configuration according to the first embodiment. A server 101 and clients 102 and 103 are connected to a network 104. Each client can communicate with the server 101 via the network 104. The clients 102 and 103 can also communicate with each other. Communication nodes which are not directly relevant to this embodiment have been omitted from FIG. 1. This embodiment assumes the use of Protocol for Carrying Authentication for Network Access (PANA) as a communication protocol in authentication processing or the like. The present embodiment, however, is not limited to this.

After connecting to the network 104, the client 102 executes authentication processing with the server 101, and obtains a master key or group master key from the server 101.

Figure 2:
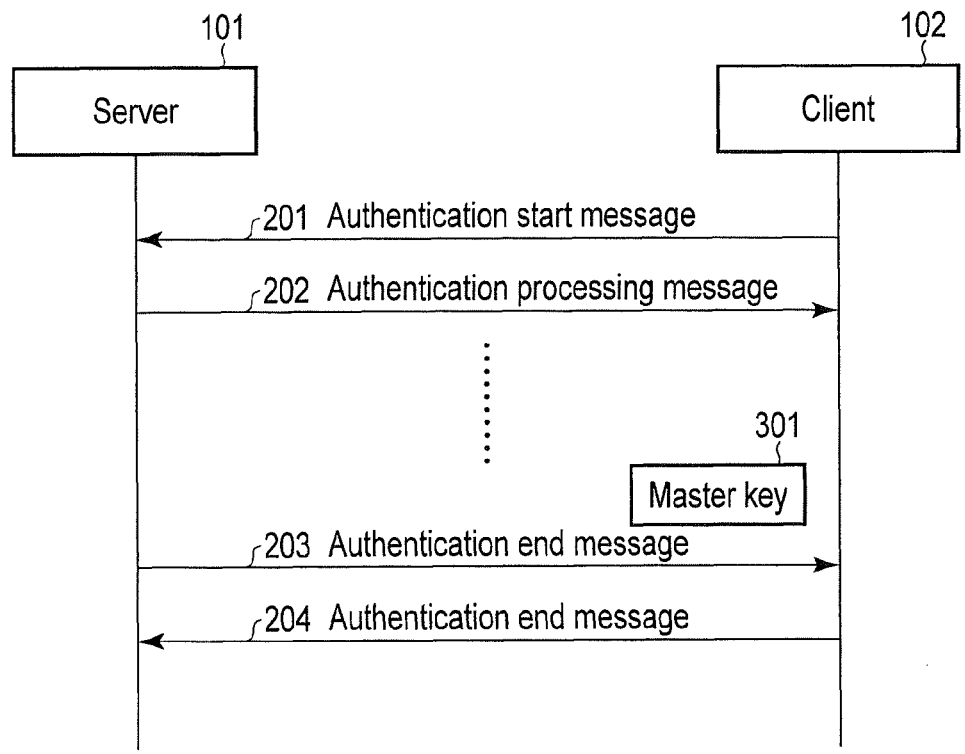
FIG. 2 is a sequence chart showing authentication processing.

FIG. 2 shows a sequence of messages in authentication processing executed between the server 101 and the client 102. The client 102 transmits an authentication start message 201 to the server 101. Upon receiving the authentication start message 201, the server 101 transmits an authentication processing message 202 to the client 102. The server 101 then performs authentication according to a predetermined authentication scheme, and transmits an authentication end message 203 to the client 102. The client 102 transmits an authentication end message 204 as a response to the server 101.

In this embodiment, a case in which authentication processing starts in response to the authentication start message 201 transmitted from the client 102 has been described. Authentication processing, however, may start when the server 101 transmits the authentication processing message 202 to the client 102 without the authentication start message 201. A proxy server or relay node may intervene in authentication processing between the server 101 and the client 102.

After authentication according to a predetermined method between the server 101 and the client 102 succeeds, the server 101 notifies the client 102 of a master key 301 by the authentication end message 203. The client 102 may also be notified of the key identifier and expiration date/time of the master key 301 as relevant information of the master key 301. The master key 301 is encrypted using the authentication result of the server 101 and client 102.

Figure 3:
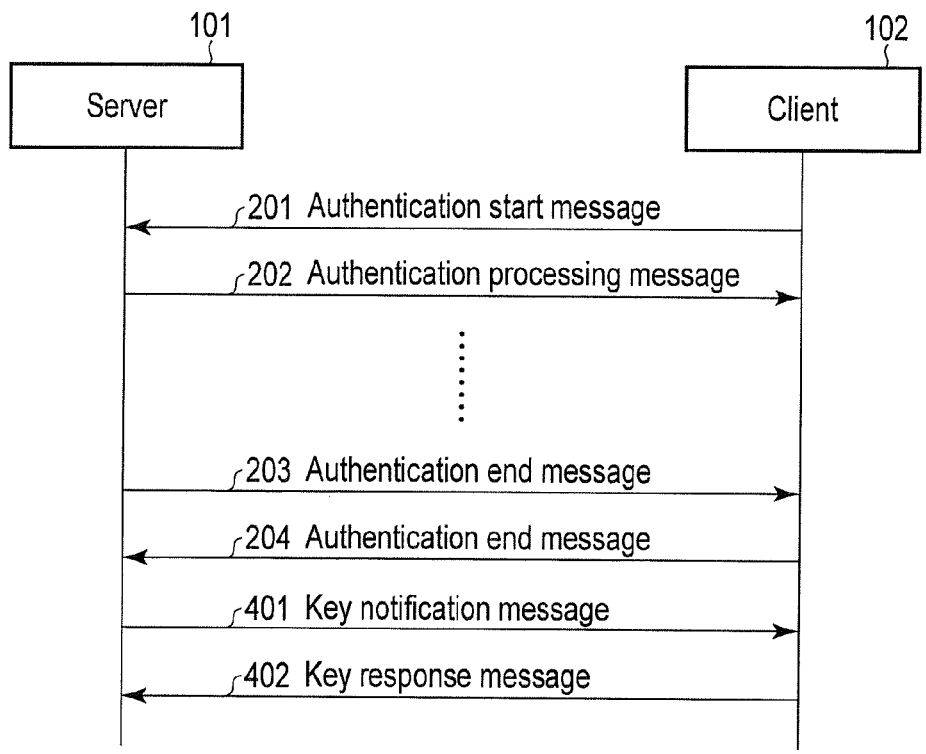
FIG. 3 is a sequence chart showing a case in which a key notification is sent immediately after authentication processing is completed.

The server 101 need not always notify the client 102 of the master key 301 as the authentication end message 203. More specifically, the server 101 may notify the client 102 of the master key 301 by including the master key 301 in a key notification message 401 shown in FIG. 3.

The client 103 also obtains the master key 301 from the server, similarly to the client 102.

Although FIG. 1 shows a case in which the two clients 102 and 103 are connected to the server 101 for descriptive convenience, a number of clients are generally connected.

The clients 102 and 103 mutually authenticate each other using the master key 301, thereby generating an individual key to be shared between the clients 102 and 103.

Figure 4:
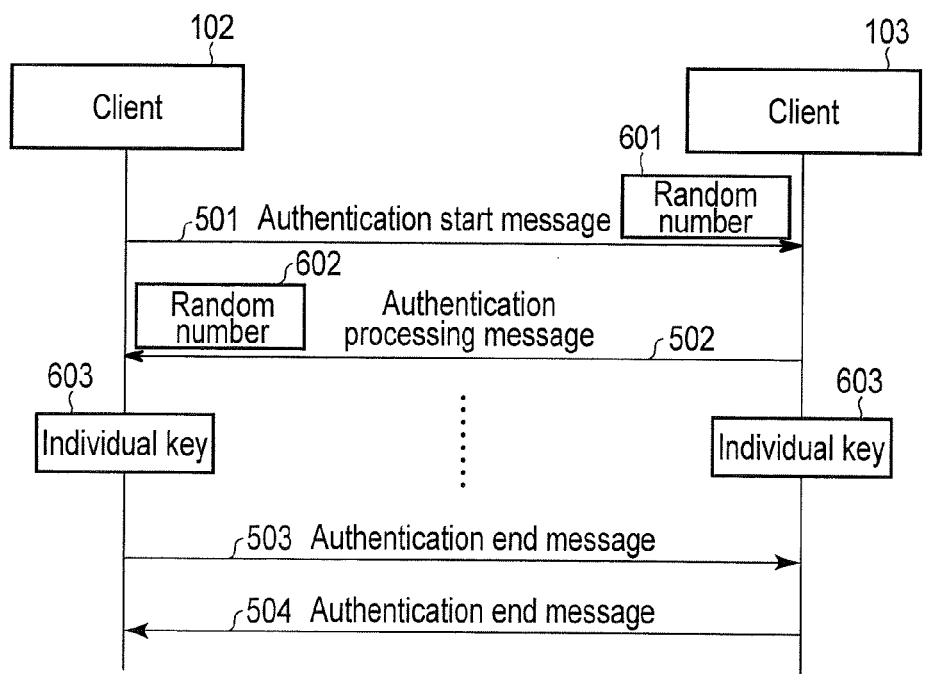
FIG. 4 is a sequence chart showing inter-client key sharing processing.

FIG. 4 shows a sequence of messages in inter-client key sharing processing. The client 102 transmits an authentication start message 501 to a client 103. The client 103 transmits an authentication processing message 502 as a response to the authentication start message 501. In response to the authentication start message and the succeeding authentication processing message, the clients 102 and 103 mutually authenticate each other using the master key 301. The clients 102 and 103 then notify each other of an authentication result and the like by authentication end messages 503 and 504.

If authentication has succeeded, the clients 102 and 103 respectively generate individual keys 603 based on the master key 301. If, for example, the client 102 notifies the client 103 of a random number 601 and the client 103 notifies the client 102 of a random number 602 during authentication processing, a hash value obtained from a predetermined hash function of the master key 301 and random numbers 601 and 602 is set as the individual key 603. The generated individual keys 603 are identical between the clients 102 and 103.

Information such as the key identifier and expiration date/time of the individual key 603 may be negotiated during the authentication processing between the clients 102 and 103, and the client 103 may be notified, by the authentication end message 503 or the like, of the information of the key identifier and expiration date/time decided by the client 102.

Figure 5:
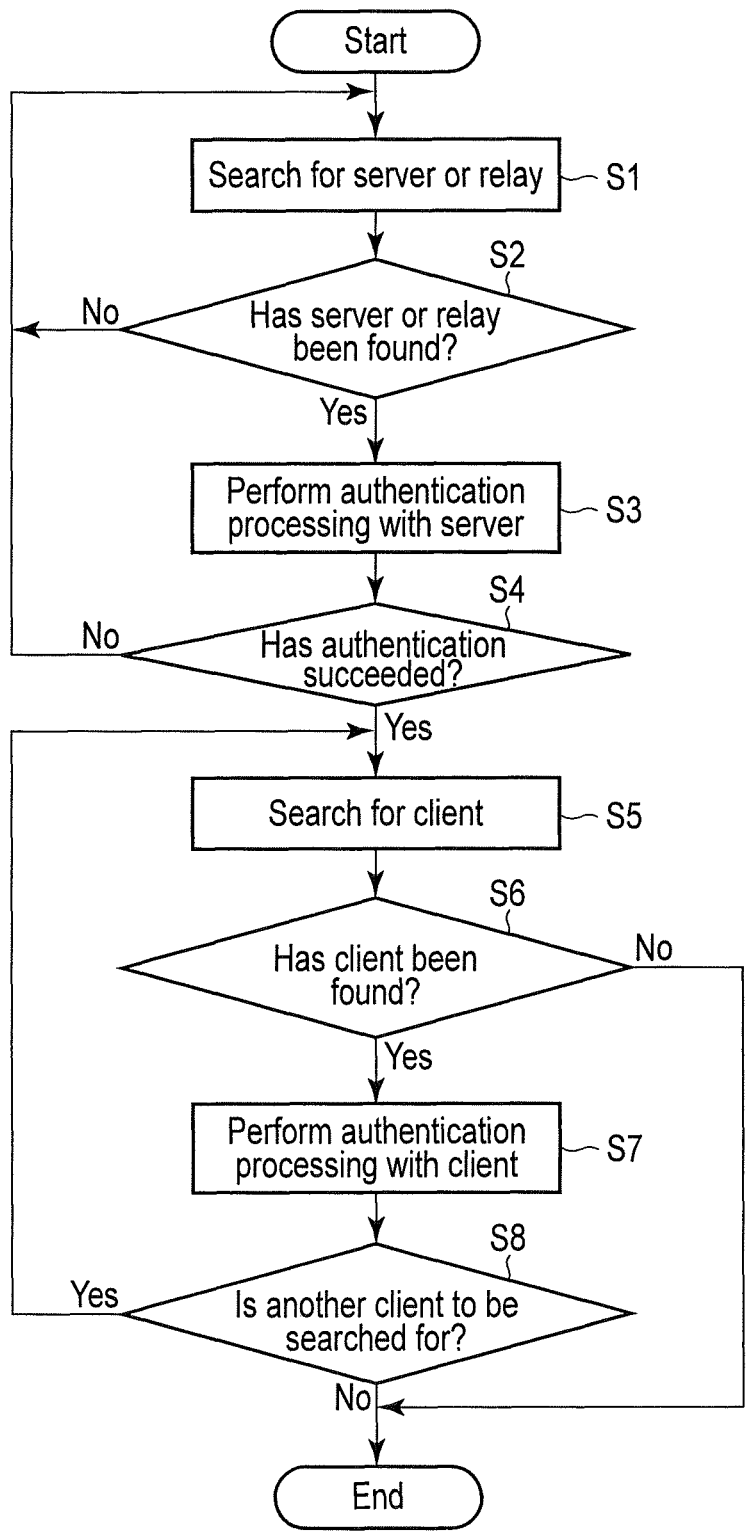
FIG. 5 is a flowchart illustrating processing upon start of a client.

FIG. 5 shows a processing procedure upon start of the client 102. Upon start of the client 102, the client 102 searches for a server or relay connected to a network (step S1). A relay is used when the client and server cannot directly communicate with each other, and transfers messages in authentication processing between the client 102 and the server. Note that when performing authentication for a statically set server or relay, it is not necessary to search for the server or relay.

If a server or relay has been found (step S2=YES), the client 102 executes authentication processing with the server (for example, the server 101) (step S3). If authentication has succeeded (step S4=YES), the client 102 searches for another client with which the above individual key should be shared (step S5). If another client has been found (step S6=YES), the client 102 executes authentication processing with the found client (for example, the client 103) (step S7). If authentication has succeeded, an individual key (the above individual key 603) is generated according to the sequence chart shown in FIG. 3. The processing in steps S5 to S8 is repeated until another client is no longer found or a predetermined number of clients are found.

Figure 6:
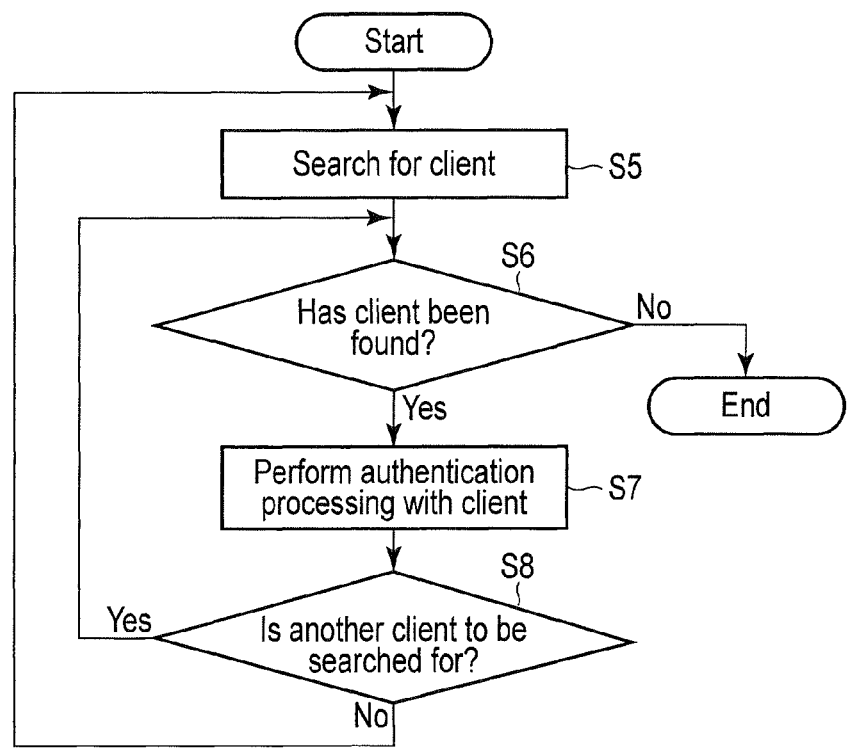
FIG. 6 is a flowchart illustrating periodic processing by the client.

Note that the processing of searching for another client and then performing authentication processing (the processing in steps S5 to S8) is not always executed immediately after the authentication processing with the server. For example, the client 102 may periodically perform processing in steps S5 to S8 shown in FIG. 6.

Figure 7:
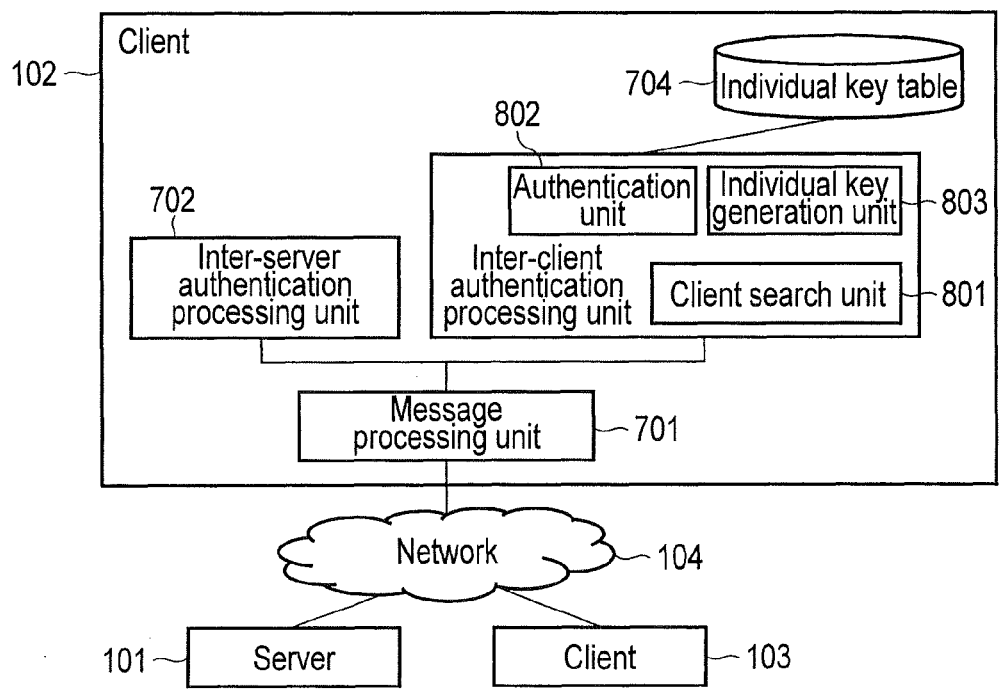
FIG. 7 is a block diagram showing the arrangement of the client.

FIG. 7 is a block diagram showing the arrangement of a client 102. The client 102 includes a message processing unit 701, an inter-server authentication processing unit 702, an inter-client authentication processing unit 703, and an individual key table 704. The message processing unit 701 receives a message transmitted from the server 101 or client 103, and transmits a message to the server 101 or client 103. The inter-server authentication processing unit 702 (first authentication unit and obtaining unit) executes authentication processing with the server 101 according to a predetermined authentication scheme. As a result, the inter-server authentication processing unit 702 obtains the master key 301 from the server 101.

The inter-client authentication processing unit 703 (second authentication processing unit) obtains the master key 301 from the inter-server authentication processing unit 702, and executes authentication processing with the client 103. The inter-client authentication processing unit 703 includes a client search unit 801, an authentication unit 802, and an individual key generation unit 803. The client search unit 801 searches for another client, and the authentication unit 802 of the inter-client authentication processing unit 703 performs authentication processing with the client 103 found as a result of the search operation. If authentication with the client 103 succeeds, the individual key generation unit 803 (generation unit) generates the individual key 603. The generated individual key 603 is saved in the individual key table 704.

The client 102 performs encryption communication with the client 103 using the individual key 603 (a communication unit).

Table 1 shows an example of the individual key table 704. In this example, the individual key table 704 has a key identifier for identifying a key, a key value as the value of the key, the expiration date/time of the key, and information of a key sharing partner.

TABLE 1

| Key identifier | Key value | Expiration date/time | Key sharing partner |
|---|---|---|---|
| 1001 | 120ajBA43anb | 2012.7.10 12:15 | Client 103 |
| 1002 | 0AXXbajoea09 | 2012.7.11 3:10 | Client 103 |
| 1003 | 9da9aQQpaie | 2012.7.9 20:20 | Client 104 |
| 1010 | mma45313Iqo | 2012.7.12 18:05 | Client 105 |

For example, an individual key identified by "1001" has a key value "120ajBAj43anb" and an expiration date/time "2012.7.10 12:15". This individual key identified by "1001" is shared with the client 103.

Second Embodiment

The second embodiment relates to update of an individual key. Before the expiration date/time of an already shared individual key, a client 102 according to the second embodiment performs authentication processing with a client 103 with which the individual key is shared, thereby updating the individual key.

For example, an expiration date/time which is the same as or before that of the master key is set upon generation of an individual key. With this setting, the individual key is updated as the master key is updated. In this example, assume that the master key is updated before its expiration date/time.

Figure 8:
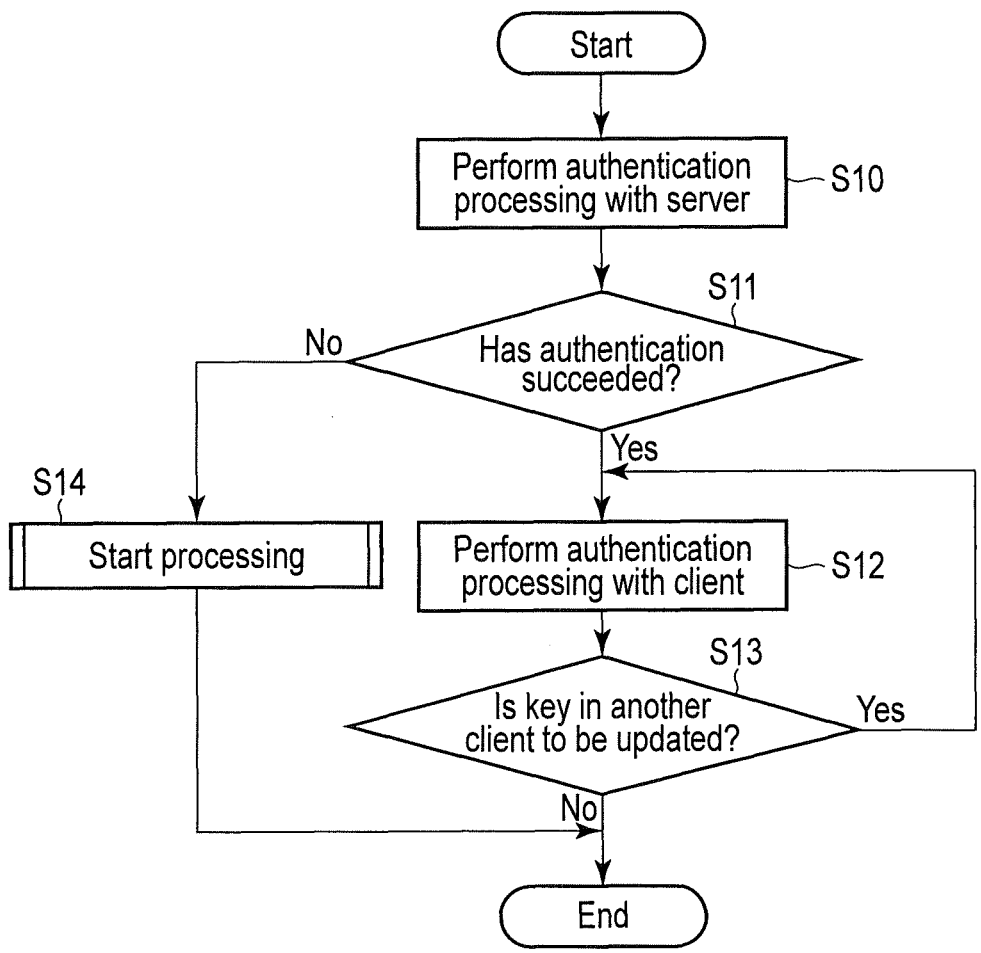
FIG. 8 is a flowchart illustrating individual key update processing upon update of a master key.

FIG. 8 is a flowchart illustrating individual key update processing upon update of the master key. Upon update of the master key, authentication processing between the client 102 and a server 101 is executed (step S10). If authentication has succeeded (step S11=YES), a new master key is generated, and the client 102 is notified of it (master key update). The client 102 performs authentication processing with a client (for example, the client 103) with which an individual key is shared, and exchanges the individual key using the master key updated in step S10 (step S12). The client 102 then searches for another client, and updates the individual key in a similar manner (step S13=YES).

Note that if the authentication processing with the server in step S10 has failed (step S11=NO), the client 102 executes start processing shown in FIG. 5 (step S14).

According to the second embodiment, when a client voluntarily updates a master key, it becomes possible to update an individual key at an arbitrary appropriate timing.

Third Embodiment

In the above-described embodiments, at least two clients which perform authentication respectively generate identical individual keys using a master key sent from a server. To the contrary, in the third embodiment, only one of at least two clients which perform authentication generates an individual key, and notifies the other client of it.

For example, among at least two clients 102 and 103 which perform authentication, only the client 102 generates an individual key. The client 102 encrypts the generated individual key using a master key. The client 102 notifies the client 103 of the encrypted individual key in authentication processing between the clients. Note that the clients 102 and 103 respectively need to have undergone authentication processing with a server 101, as a matter of course.

In the third embodiment, it is possible to share an individual key between clients, similarly to the first embodiment.

According to the above-described embodiments, it is possible to dynamically share an individual key between nodes. Note that the processing procedure described in the aforementioned embodiments can be executed based on a program as software. A general-purpose computer system stores this program in advance, and loads the program, thereby obtaining the same effects as those of the handwritten document processing apparatus of the aforementioned embodiments. Instructions described in the aforementioned embodiments are recorded in a recording medium such as a magnetic disk (flexible disk, hard disk, and the like), an optical disk (CD-ROM, CD-R, CD-RW, DVD-ROM, DVD±R, DVD±RW, and the like), a semiconductor memory, and the like as a program that can be executed by a computer. The storage format of such recording medium is not particularly limited as long as the recording medium is readable by a computer or embedded system.

Furthermore, the recording medium of this embodiment is not limited to a medium independent from the computer or embedded system, and includes a recording medium which stores or temporarily stores a program downloaded via a LAN or the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A client apparatus comprising:
a computer; and
a program that includes an obtaining unit, a generation unit, and a communication unit, the program, when executed by the computer, causes:
the obtaining unit to obtain a master key from a server apparatus, the master key being notified after authentication between the server apparatus and the client apparatus succeeds;
the generation unit to generate an individual key by the client apparatus by using the master key from the sever apparatus, the individual key being shared between the client apparatus and a second client apparatus that mutually authenticate each other using the master key; and
the communication unit that communicates with the client apparatus and the second client apparatus using the individual key.

2. The apparatus according to claim 1, wherein the generation unit generates the individual key by using the master key and information exchanged with the second client apparatus in a process of mutual authentication with the second client apparatus.

3. The apparatus according to claim 2, wherein the program further comprises a first authentication processing unit and a second authentication processing unit, the program, when executed by the computer, causes:
the first authentication processing unit to obtain the master key by performing first authentication processing with the server apparatus, and
the second authentication processing unit to perform mutual authentication with the second client apparatus using the master key, and exchange a random number with the second client apparatus,
wherein the generation unit generates the individual key by using the master key and the random number.

4. A communication method comprising:
obtaining, by an obtaining unit, a master key from a server apparatus, the master key being notified after authentication between the server apparatus and a client apparatus succeeds;
generating, by a generation device, an individual key by the client apparatus by using the master key from the server apparatus, the individual key being shared between the client apparatus and a second apparatus that mutually authenticate each other using the master key; and
communicating, by a communication unit, with the client apparatus and the second client apparatus using the individual key.

5. A system comprising a server for providing a master key, and a first client and a second client for performing authentication processing with the server over a network,
the first client comprising
a first obtaining unit that obtains, when executed by a computer, the master key from the server over the network, the master key being notified after authentication between the server and each of the first client and the second client succeeds,
a first generation unit that generates, when executed by the computer, an individual key by using the master key, the individual key being shared between the first client and the second client which mutually authenticate each other using the master key and
a first communication unit that communicates, when executed by a computer, with the second client using the individual key, and
the second client comprising
a second obtaining unit that obtains, when executed by a computer, the master key from the server,
a second generation unit that generates, when executed by the computer, the individual key by using the master key, and
a second communication unit that communicates, when executed by a computer, with the first client using the individual key.

6. A non-transitory computer-readable medium comprising a program for causing a computer to function as
an obtaining unit that obtains a master key from a server apparatus, the master key being notified after authentication between the server apparatus and a client apparatus succeeds,
a generation unit that generates an individual key by the client apparatus by using the master key from the server apparatus, the individual key being shared between the client apparatus and a second apparatus that mutually authenticate each other using the master key, and
a communication unit that communicates with the client apparatus and the second communication apparatus using the individual key.

* * * * *